(12) United States Patent
Tuxen et al.

(10) Patent No.: US 12,179,068 B2
(45) Date of Patent: *Dec. 31, 2024

(54) SYSTEM AND METHOD FOR DETERMINING SPIN MEASUREMENTS USING BALL MARKING

(71) Applicant: TRACKMAN A/S, Vedbaek (DK)

(72) Inventors: Fredrik Tuxen, Rungsted Kyst (DK); Nicolaj Peter Hermansen, Holte (DK); Thomas Harries Hasselbalch, Hillerød (DK)

(73) Assignee: TRACKMAN A/S, Vedbaek (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,493

(22) Filed: Apr. 28, 2023

(65) Prior Publication Data

US 2023/0264077 A1 Aug. 24, 2023

Related U.S. Application Data

(63) Continuation of application No. 16/925,880, filed on Jul. 10, 2020, now Pat. No. 11,673,029.

(Continued)

(51) Int. Cl.
*A63B 43/06* (2006.01)
*G01S 13/58* (2006.01)
*G01S 13/88* (2006.01)

(52) U.S. Cl.
CPC ............ *A63B 43/06* (2013.01); *G01S 13/581* (2013.01); *G01S 13/88* (2013.01)

(58) Field of Classification Search
CPC ... A63B 43/06; A63B 43/008; A63B 69/3658; A63B 2220/35; A63B 2102/18; A63B 2102/32; A63B 2220/89
See application file for complete search history.

(56) References Cited

U.S. PATENT DOCUMENTS 676,506 A * 6/1901 Knight et al. ....... A63B 43/008
 D21/708
3,630,601 A * 12/1971 Lehovec ............ A63B 69/3658
 434/249

(Continued)

FOREIGN PATENT DOCUMENTS

CN 106643662 5/2017
CN 109997054 7/2019

(Continued)

*Primary Examiner* — Steven B Wong
(74) *Attorney, Agent, or Firm* — Fay Kaplun & Marcin, LLP (57) ABSTRACT

A sports ball is configured to enhance detection of spin properties by radar. The ball includes a spherical body having a first reflectivity with respect to radiation generated by a radar to be used in detecting spin of the ball. In addition, the ball includes a plurality of markers. Each of the markers has a second reflectivity with respect to the radiation generated by a radar to be used in detecting spin of the ball. The second reflectivity is different from the first reflectivity. The markers are distributed on the ball so that every great circle extending around an exterior surface of the ball is within a distance d of a projection on the exterior surface of the ball of at least one of the markers. The distance d is less than a radius of the ball.

14 Claims, 7 Drawing Sheets

Related U.S. Application Data (60) Provisional application No. 62/970,394, filed on Feb. 5, 2020, provisional application No. 62/913,523, filed on Oct. 10, 2019, provisional application No. 62/873,105, filed on Jul. 11, 2019.

(56) References Cited

U.S. PATENT DOCUMENTS

| | | | | |
|---|---|---|---|---|
| 4,546,975 | A * | 10/1985 | Nims | A63B 43/008 |
| | | | | 473/447 |
| 5,067,719 | A * | 11/1991 | Mook | A63B 69/3655 |
| | | | | 473/200 |
| 5,427,378 | A * | 6/1995 | Murphy | A63B 43/06 |
| | | | | 473/378 |
| 5,713,799 | A * | 2/1998 | Balmat | A63B 37/0022 |
| | | | | 473/200 |
| D412,193 | S * | 7/1999 | Sullivan | D21/709 |
| D429,510 | S * | 8/2000 | Sullivan | D21/709 |
| 6,244,971 | B1 * | 6/2001 | Mihran | A63B 24/0021 |
| | | | | 473/378 |
| 6,612,942 | B1 * | 9/2003 | Battersby | A63B 37/14 |
| | | | | 124/78 |
| D546,911 | S * | 7/2007 | Kirschbaum | D21/713 |
| 7,241,234 | B2 * | 7/2007 | Eite | A63B 69/002 |
| | | | | 473/422 |
| 7,444,770 | B2 * | 11/2008 | Wellington, Jr. | A63B 45/02 |
| | | | | 40/327 |
| 10,850,179 | B2 * | 12/2020 | Tuxen | A63B 69/3658 |
| 11,673,029 | B2 * | 6/2023 | Tuxen | A63B 69/3658 |
| | | | | 473/569 |
| 2003/0181253 | A1 * | 9/2003 | Kim | A63B 37/0004 |
| | | | | 473/280 |
| 2013/0324310 | A1 * | 12/2013 | Leech | A63B 37/00221 |
| | | | | 473/378 |
| 2014/0191896 | A1 * | 7/2014 | Johnson | G01S 13/58 |
| | | | | 342/104 |
| 2017/0254892 | A1 * | 9/2017 | Tuxen | G01S 13/88 |
| 2019/0351294 | A1 * | 11/2019 | Klassen | B05D 1/02 |
| 2022/0161101 | A1 * | 5/2022 | Madson | A63B 37/0076 |
| 2022/0161102 | A1 * | 5/2022 | Hogge | A63B 43/008 |
| 2022/0161104 | A1 * | 5/2022 | Hogge | A63B 37/0022 |
| 2022/0161118 | A1 * | 5/2022 | Madson | A63B 37/004 |

FOREIGN PATENT DOCUMENTS

| | | |
|---|---|---|
| JP | 2012068139 | 4/2012 |
| WO | 2011/074247 | 6/2011 |

\* cited by examiner

SYSTEM AND METHOD FOR DETERMINING SPIN MEASUREMENTS USING BALL MARKING

PRIORITY CLAIM

This application is a Continuation application of U.S. patent application Ser. No. 16/925,880 filed on Jul. 10, 2020; which claims priority to U.S. Provisional Patent Application Ser. No. 62/873,105 filed Jul. 11, 2019, U.S. Provisional Patent Application Ser. No. 62/913,523 filed Oct. 10, 2019, and U.S. Provisional Patent Application Ser. No. 62/970,394 filed Feb. 5, 2020. The specifications of the above-identified patents/applications are incorporated herewith by reference.

FIELD

The present disclosure relates to a system and a method for determining spin characteristics of a sports ball with reflective markings.

BACKGROUND

Spin parameters such as the spin rate and orientation of the spin axis of a sports ball are highly useful both for tracking sports balls, for simulating the flight of sports balls and for developing sports equipment such as sports balls, clubs, irons, rackets, bats or the like used for launching sports balls. Such determinations may be made based on the signature in radar data corresponding to the spinning ball.

U.S. Pat. No. 8,845,442 discloses a method for determining the spin rate of a sports ball by analyzing the modulation of a Doppler radar signal of a spinning ball in flight. However, the modulation signal using this method is relatively weak. In situations where data is available only for a very short ball flight, such as in an indoor golf setup, the modulation signal of an unmarked ball is often too weak to be useful for a spin rate measurement.

To amplify the modulation signal and make spin detection possible in these situations, reflective markers may be placed on the ball. However, to generate useful data, prior systems often required that the reflective marker be oriented precisely before launching the ball and in many cases, systems would be required to have exact a priori knowledge about the marking pattern. For example, the marker may be required to be oriented directly facing the radar device during its flight. These orientation limitation for the ball may inhibit the user friendliness of the system, and useful data may not be generated for ball trajectories when the ball is launched differently than intended.

The current embodiments describe a method and apparatus for determining spin characteristics of a ball, such as spin rate and orientation of spin axis, by applying contrast regions to the ball with a specific positioning requirement in such a way, that no matter the orientation of the spin axis and position of the radar antennas, no matter the orientation of the ball and without requiring any knowledge about the specific positioning geometry of the contrast regions, the spin characteristics can be determined from the modulation of received radar signal(s).

SUMMARY

The present disclosure relates to a sports ball configured to enhance detection of spin properties by a radar. The ball includes a spherical body having a first reflectivity with respect to radiation generated by the radar to be used in detecting spin of the ball; and a plurality of markers, each of the markers having a second reflectivity with respect to the radiation generated by a radar to be used in detecting spin of the ball, the second reflectivity being different from the first reflectivity. The markers are distributed on the ball so that every great circle extending around an exterior surface of the ball is within a distance d of a projection on the exterior surface of the ball of at least one of the markers. The distance d is less than a radius of the ball.

In an embodiment, the markers are circular and the projection on the exterior surface of the ball of each marker comprises a cone extending from a center of the ball to the exterior surface of the ball circumscribing the marker.

In an embodiment, at least one of the markers is a planar disc embedded within the sports ball.

In an embodiment, at least one of the markers is a portion of a spherical surface within the ball circumscribed by a circle, the spherical surface having the same center as the ball.

In an embodiment, the markers are rectangular and the projection on the exterior surface of the ball of each marker comprises a pyramid extending from a center of the ball to the exterior surface of the ball circumscribing the marker.

In an embodiment, at least one of the markers is a planar rectangle embedded within the sports ball.

In an embodiment, at least one of the markers is a portion of a spherical surface within the ball circumscribed by a pyramid extending from a center of the ball to the exterior surface of the ball.

In an embodiment, when more than one marker is within the distance d of a great circle, the projections of all of these markers on the exterior surface of the ball are unequally distributed about the great circle.

In an embodiment, there are only two markers within the distance d of a first one of the great circles, these markers are not diametrically opposed to one another.

In an embodiment, the two markers are not diametrically opposed to one another within a predetermined tolerance.

In an embodiment, the markers within the distance d of the great circle are separated from positions of equal distribution about the great circle by at least a distance m from the projections onto the exterior surface of the ball of every other marker whose projection is within the distance d of the great circle.

In an embodiment, the diametrically opposed position of each marker is a portion of the exterior surface of the ball diametrically opposed to the projection of the marker onto the exterior surface of the ball, wherein the diametrically opposed position for each marker has the same size and shape as the projection of the corresponding marker onto the exterior surface of the ball.

In an embodiment, at least a portion of each of the markers extends within a single hemisphere of the ball.

The present disclosure also relates to a sports ball configured to enhance detection of spin properties by a radar. The ball includes a spherical body having a first reflectivity with respect to radiation generated by the radar to be used in detecting spin of the ball; and a spherical layer within the ball of a material having a second reflectivity with respect to the radiation generated by a radar to be used in detecting spin of the ball, the second reflectivity being different from the first reflectivity, a plurality of markers formed within the layer at which the material of the layer is not present so that the markers have the first reflectivity. The markers are distributed on the ball so that every great circle extending around an exterior surface of the ball is within a distance d of a projection on the exterior surface of the ball of at least one of the markers. The distance d is less than a radius of the ball.

In addition, the present disclosure relates to a method for manufacturing a sports ball configured to enhance detection of spin properties by a radar. The method includes forming a spherical body having a first reflectivity with respect to radiation generated by the radar to be used in detecting spin of the ball; and forming on the sports ball a plurality of markers, each of the markers having a second reflectivity with respect to the radiation generated by a radar to be used in detecting spin of the ball, the second reflectivity being different from the first reflectivity. The markers are distributed on the ball so that every great circle extending around an exterior surface of the ball is within a distance d of a projection on the exterior surface of the ball of at least one of the markers. The distance d is less than a radius of the ball.

BRIEF DESCRIPTION

DETAILED DESCRIPTION

The exemplary embodiments may be further understood with reference to the following description and the related appended drawings, wherein like elements are provided with the same reference numerals. The exemplary embodiments relate to a system and method for radar-based determinations of spin characteristics of a sports ball, where the exemplary sports ball is modified by incorporating markers having an electrical reflectivity different from other areas of the ball. The reflective markers provide a contrast region on the surface (or close to the surface) of the ball that may be detected in radar data. For example, the markers may be electrically conductive in the frequency region of the radar being used in the flight trajectory measurement system so that microwave radiation transmitted by the radar is reflected and received differently by the markers than the radiation impacting other portions of the ball. Specific positioning constraints for the markers are described below, that permit the detection of the markers regardless of the orientation of the axis about which the ball is spinning relative to the radar.

Although exemplary embodiments detailed herein describe golf balls or baseballs having these markings, those skilled in the art will understand that any sports balls or even non-sports related objects may be marked and have spin characteristics determined in the same manner. The exemplary embodiments may be applicable to any spherical or substantially spherical ball. For example, although a golf ball may be generally spherical, the outer surface of the ball may include dimples, one or more seams or other surface irregularities and a baseball may have raised seams. However, for present purposes these balls may be assumed to be generally spherical.

Although markings distributed over portions of a ball may in certain cases change the properties of the ball (e.g., how the ball reacts to impact with the club) and potentially alter flight characteristics of the modified ball relative to those of an unmodified golf ball, the impact of markers as described herein will be minimal as the markers may be made exceedingly thin and light in comparison to the ball and, for many of the applications for which these exemplary modified ball is intended, these effects are effectively inconsequential or, if need be may be compensated for in the process of modelling the flight of the ball as would be understood by those skilled in the art. For example, in an indoor golf setting, struck balls may travel only a short distance (e.g., 3-4 meters) before hitting a screen. Any effect to the launch characteristics of the ball or the flight within that short distance would be minimal, and the indoor golf system may project the path of the ball using ideal golf ball properties in combination with its launch characteristics in its calculations. In another example, the ball may be a baseball, and the spin characteristics of the baseball may be determined for a pitch or in a batting cage scenario.

According to one exemplary embodiment, a spherical ball is marked to satisfy a positioning requirement described in detail below. An optional additional positioning constraint is also described to further improve the usage. The requirement and the optional constraint may be met by many different marker arrangements tailored, for example, to the type of ball being marked. For example, for a golf ball, the markers may comprise a plurality of circular markers distributed relatively evenly around the ball, while for a baseball the markers may be located coextensively with the seams of the baseball, or a portion thereof. The markers may be shaped in any manner, however circular or rectangular markers may provide a clearer signal in the radar data. For example, a typical marker for a golf ball is circles with a diameter of 2-8 mm, a key dimension of the markers (e.g., a diameter or maximum width) is typically selected to be between 0.25 and 0.5 times the wavelength used by the radar. It is noted that a marker described herein as circular is not necessarily a two-dimensional circle, but is rather a three-dimensional shape corresponding to a portion of the surface of a sphere (e.g., the outer surface of the ball or an inner spherical surface) circumscribed by a circle.

Similarly, a marker described as rectangular may be a two-dimensional rectangle but may also be a three-dimensional shape formed as a portion of a sphere bounded by the intersection with the sphere of a pyramid having an apex at a center of the sphere. As would be understood by those skilled in the art, this may depend on the structure of the interior of the ball. Balls having spherical inner layers may have markers formed on portions of these spherical layers while a ball that has a unitary core or a core including a unitary member, may have circular or other shaped planar markers embedded therein. In the following, these markings may be referred to as the two-dimensional shapes they approximate as the precise shape of the markers is not as important as their pattern of distribution about the surface of the ball. A typical number of circular/rectangular markers may be between 5-20. The projections of the markers onto an outer surface of the ball will typically cover 2 to 25% of a surface area of the ball. This ensures that the markers generate the desired amplification of the modulation signal due to spin on the received Doppler signal. Any number of markers may be used that satisfy the positioning constraints. Furthermore, although embodiments are described that include all circular markers or that include all rectangular markers, those skilled in the art will understand that a ball may contain a mixture of markers of various shapes.

A marker positioning requirement is that a distance from every great circle around the ball to a nearest one of the markers must be no more than a predefined minimum distance d. Those skilled in the art should note that, although d is normally positive it can also be negative. In the case where d is negative, any great circle around the ball will pass through at least one marker with a distance d to the non-marked area in the direction perpendicular to the great circle where the great circle intersects the marker. A great circle (GC) is the path defined by the intersection of a plane going through the center point of the sphere and the exterior of the sphere, in other words, an equator of the sphere.

A sphere has an infinite number of orientations for a great circle, each having a same diameter as the sphere. Thus, no matter what axis the ball is rotating about, one of the great circles of the ball will define a plane within which the ball is rotating. By ensuring that there is at least one marker within the defined minimum distance of every great circle, the ball according to the present invention, ensures regardless of the orientation of the axis of rotation of the ball, an oscillating signal generated by at least one of the markers will be detected in the reflected radar signal. Thus, according to the positioning requirement, the markers must be positioned so that no great circle may be projected onto the ball that is not within the distance d of at least one marker. In some embodiments, the distance d may be zero or negative, i.e., every possible great circle hits at least one marker. Having a d of zero or negative will in general strengthen the modulation of the Doppler signal due to spin of the ball. This may be advantageous in situations where the time of flight of the ball is very short, such as a golf ball hit into a net or screen in a simulator environment. However, the distance d may vary for different balls.

In general, the distance d is significantly smaller than the diameter of the ball, e.g. on the order of 0 to ⅕ of the diameter of the ball. Considered a different way, a strip of width d circling the exterior of the sphere and having a great circle at its center (i.e., bisecting the strip) must touch at least one of the markers, regardless of the placement of the great circle on the ball. In the following, this strip will be referred to as a great circle of width d. The distance d is defined as the maximum distance from the great circle to the closest part of the nearest marker.

Figure 1A:
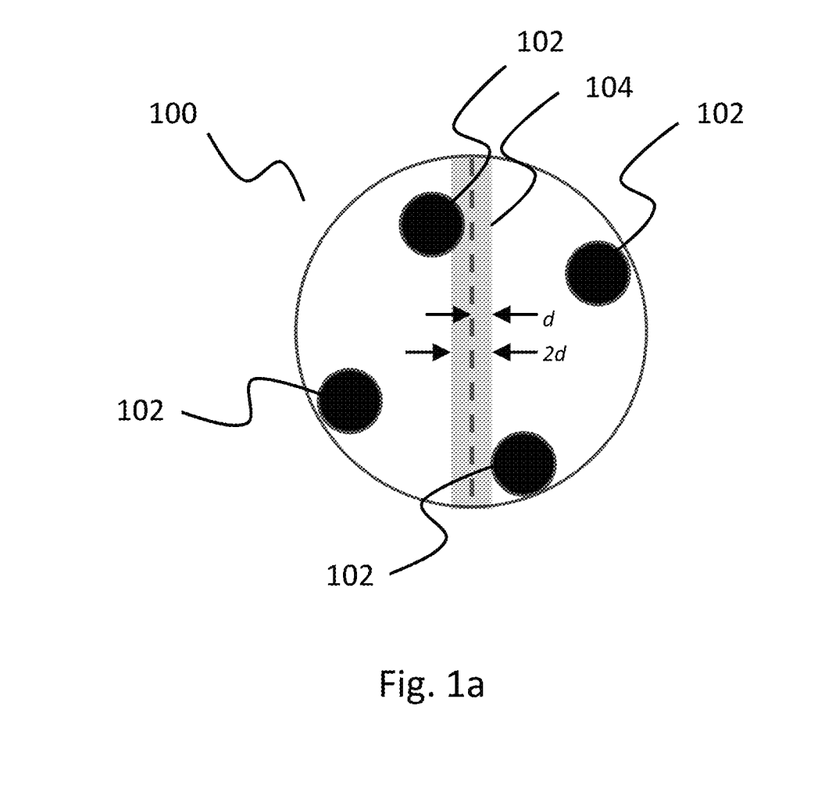
FIG. 1a shows a first marked ball with a great circle surrounded by band of width 2d drawn thereon that satisfies the positioning requirement.
Figure 1B:
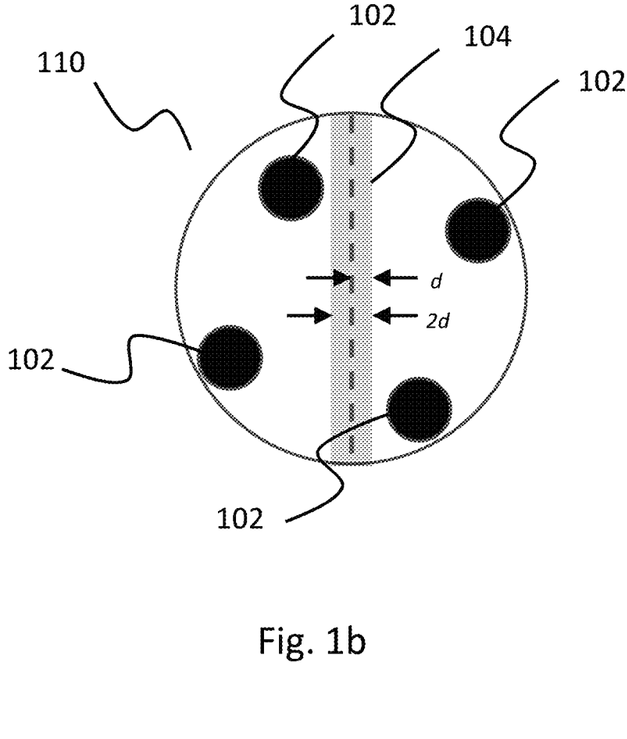
FIG. 1b shows a second marked ball with a great circle surrounded by a band of width 2d drawn thereon that does not satisfy the positioning requirement.
Figure 1C:
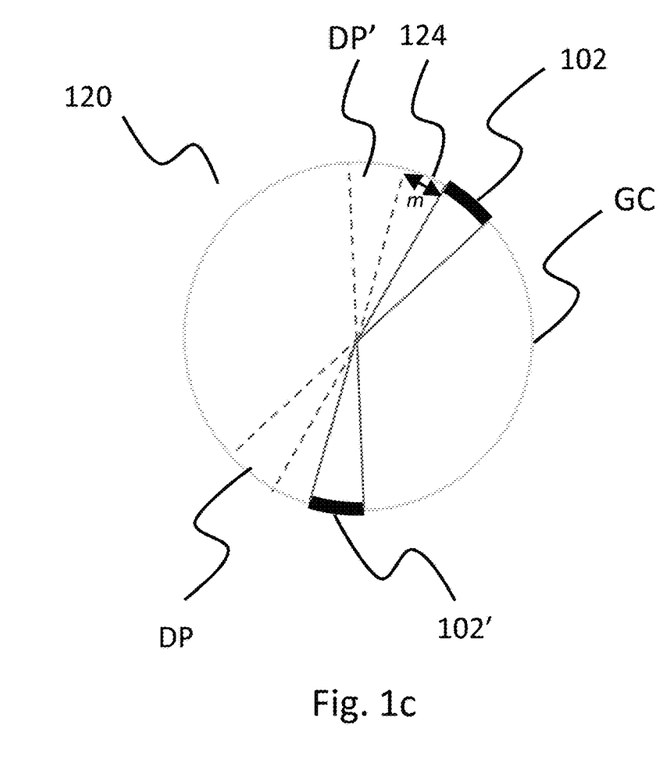
FIG. 1c shows a top view of a third marked ball having multiple markers contacting a band of width 2d surrounding the same great circle and satisfying an optional additional positioning constraint.
Figure 1D:
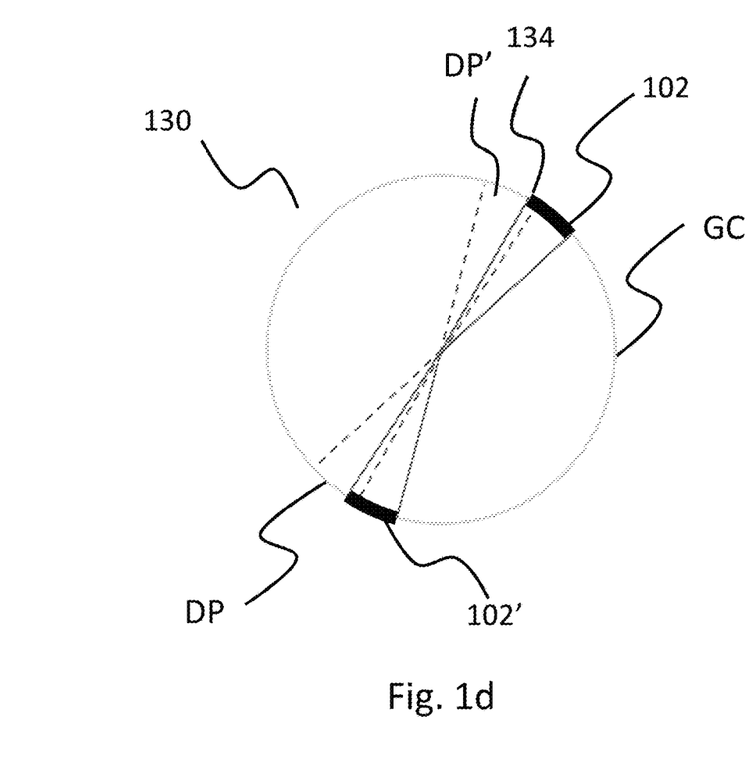
FIG. 1d shows a top view of a fourth marked ball having multiple markers contacting a band of width 2d surrounding the same great circle and which does not satisfy the additional positioning constraint.
Figure 1E:
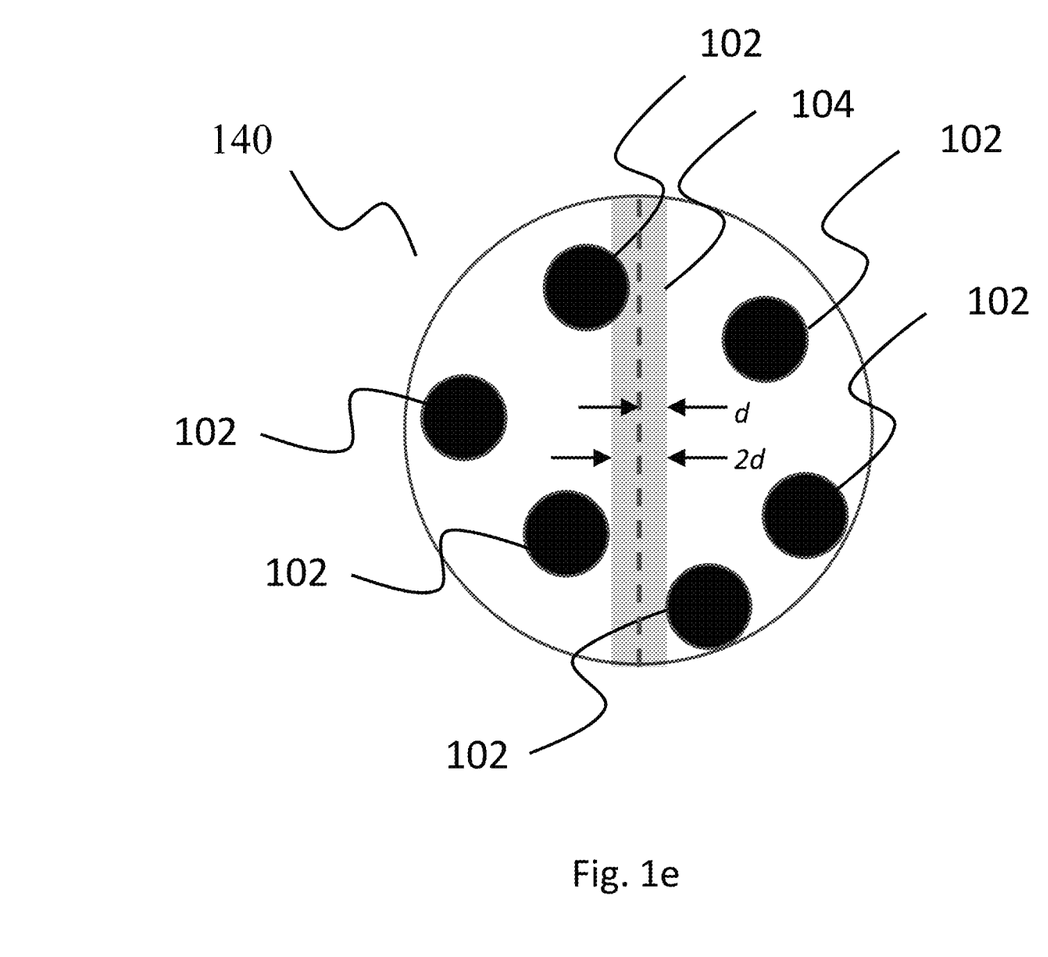
FIG. 1e shows a fifth marked ball with a great circle surrounded by band of width 2d drawn thereon that satisfies the positioning requirement.

FIG. 1e shows a fifth marked ball 140 with a band 104 of width 2d extending around a great circle GC where the markers 102 satisfy the positioning requirement—i.e., the markers 102 are distributed over the ball 100 so that no great circle GC of the ball does not pass within distance d of at least one of the markers 102. In this illustrative example, the marked ball 140 has six markers 102 on the portion of its spherical surface shown in this figure. Other markers 102 may be used on the opposite side of the ball 140 (not shown). As described above, each of the markers 102 has a reflectivity different from the remainder of the ball.

As would be understood by those skilled in the art, this may be achieved by forming markers of a material having a reflectivity (with respect to the radar signal) higher than that of the ball itself, or by forming a layer of highly reflective material with markers formed as islands not including this highly reflective material or from which this highly reflective material has been removed. As shown, the band 104 surrounding great circle GC touches at least one marker 102 and, as can be deduced from an analysis of the geometry of the ball 140 and the placement and size of the markers 102, this is true for any great circle that could be drawn on the ball 140. To ensure that this condition is met, the markers 102 must.

FIG. 1a shows a view of the first marked ball 100 with a band 104 surrounding a great circle GC of width 2d drawn thereon that satisfies the positioning requirement. In FIG. 1a, four markers 102 are shown on the spherical surface of the first ball 100, and other markers 102 are included on the opposite side of the ball 100 (not shown) to satisfy the positioning requirement. As shown, the band 104 surrounding GC touches two of the markers 102.

FIG. 1b shows a view of the second marked ball 110 with a band 104 surrounding a great circle GC of width 2d drawn thereon that does not satisfy the positioning requirement. In FIG. 1b, four markers 102 are shown on the spherical surface of the second ball 110, and other markers 102 may be included on the opposite side of the ball 110 not shown in FIG. 1b but positioned so that none of them touches the band 104. As shown, the band 104 surrounding GC does not touch any of the markers 102. In this illustrative example, it is assumed that the band 104 also does not touch any of the markers 102 on the opposite side of the ball 110. Thus, the marker positioning for the ball 110 does not meet the positioning requirement and is unacceptable for consistently generating useful data for determining spin parameters. For example, the ball 110 may rotate in such a manner that no marker 102 is present in an area of maximum spin of the ball 110.

An optional additional marker positioning constraint is that, if more than one marker touches the band of width 2d surrounding a great circle, this group of markers in this embodiment may not be symmetrically distributed around this great circle within a tolerance of m or the resulting modulations may make it difficult to determine the spin rate between choices that are integer multiples of one another—i.e., the same data may represent 1,000, 2,000 or 3,000 rpm, etc. In other words, for any great circle having two or more markers touching the band of width 2d, these markers must not be equally angularly separated from one another about the great circle. In the case of two markers touching the great circle band, a first marker 102 touching the band of width 2d must be separated by at least a distance m from the closest portion of a position DP diametrically opposed to a second marker 102' that touches the band.

In the case where 3 markers are touching the great circle band, the markers need to be separated from perfect 120 degree distribution of the markers on the great circle by a margin m, and a similar constraint will be applied to any number of markers more than 3 markers touching the great circle band. Although the distance m may vary for different balls, in general this distance m is significantly smaller than the diameter of the ball (e.g., typically ⅒ of the diameter of the ball or less). As the value of m approaches zero, the distance between the marker 102 and the projection DP of the second marker 102' will shrink until the marker 102 abuts the projection DP.

FIG. 1c shows a view of a third marked ball 120 looking along the axis of rotation of the ball (i.e., a cross-section of the ball 120 is shown including a great circle GC defining a path of maximum rotational speed of the ball 120. The ball 120 has multiple markers 102, 102' contacting the band of width 2d surrounding a great circle GC and which satisfies the additional positioning constraint as described below. Two markers 102, 102' are shown in this example, each having a corresponding diametrically (relative to the GC) opposite projection (DP, DP', respectively). The distance 124 between the marker 102 and the projection DP' of the marker 102' is shown as being greater than the distance m. Those skilled in the art will recognize that geometry dictates that the distance between the marker 102' and the projection DP of the marker 102 is equal to the distance 124. Thus, the marker positioning for this particular great circle 104 meets the additional positioning constraint discussed above.

FIG. 1d shows a fourth marked ball 130 looking along the axis of rotation of the ball 130 as in FIG. 1c. The ball 130 includes a first marker 102 contacting a band of width 2d surrounding a great circle GC and a second marker 102' which also contacts the band surrounding GC. As seen in FIG. 1d, however, the projection DP' of marker 102' is separated from the marker 102 by a distance 134 that is less than m and, in this example, the marker 102 and DP' actually overlap. In other words, the marker 102 is separated from DP' by a negative distance which is clearly less than m). Thus, the distancing between the markers 102 and the projections 132 violates the additional positioning constraint. In other words, the markers 102 are distributed too symmetrically around the great circle 104. When the markers are positioned too symmetrically around the great circle, the received Doppler signal may have characteristics that, when applying for example the method described in U.S. Pat. No. 8,845,442, increase the risk that a spin rate will be calculated that is exactly N times higher than an actual spin rate, where N is the number markers touching the great circle. The optional additional positioning constraint eliminates this risk. However, as would be understood by those skilled in the art, other methods may also be used to detect whether a calculated spin rate is actually N times the correct spin rate and to take appropriate steps to correct this error.

As noted above, various marker arrangements may be used to satisfy the two requirements. In general, an uneven number of markers may be used, where each of the markers is separated by minimum distance from any neighboring markers and are asymmetric relative to any other markers on the sphere. As will be described in further detail below, the ball markings may be on the surface of the ball or on a layer of the ball below the surface. When the markings are below the outer surface of the ball, a cover material used for the outer surface should be substantially semi-transparent to the radiation employed by the radar (e.g., microwave radiation) so that this radiation can penetrate the ball to reach the marker and be reflected therefrom (or reflected differently from other parts of the ball whether in the same internal layer, on the surface of the ball or embedded in another layer). When the markings for a golf ball are on the outer surface, the markings should be highly durable so that they will not come off during use and/or stain the hitting screen in a golf simulator. Normal wear, such as the wear inflicted on golf ball branding, is expected.

As described above, the markers must have an electrical reflectivity (or more accurately reflectivity with respect to the radiation generated and gathered by the radar system) different from other areas of the ball, creating a contrast region at different points distributed about the surface of the ball. For example, the markers may be electrically conductive in the frequency region of radar being used, thus amplifying the modulation signal of a reflected radar signal for a spinning ball. The spin modulation signal can then be used to determine the spin rate and spin axis of the ball even when the flight time for the ball is very short.

The exemplary spherical balls may be marked on layers other than the outermost layer (i.e., external surface) of the ball. A layer of a spherical ball refers to a spherical surface on or within the ball centered about the center of the ball. These layers may be abstract geometric divisions of a substantially unitary core, or may be defined by separate layers of materials overlaying one another to form the ball.

According to one embodiment, a ball has one or more first regions comprised of typical ball materials, e.g., plastic or rubber for a golf ball and a plurality of second regions (markers) of material with a microwave reflection coefficient Γ2. Those skilled in the art will understand that the microwave reflection coefficient represents a difference in wave impedance between the air through which the microwaves are traveling and the particular material of a given region of the ball. Although the phenomena that determine the precise form of the waves reflected from the ball to the radar are complex, it is sufficient to understand that the selection of materials having divergent values of microwave reflectivity will be most effective in generating measurable modulations to make accurate measurements of spin characteristics. The second regions may be located at any layer of the one- to multi-layer ball. The ball further has, on the same layer as the second regions, one or more first regions of material with a microwave reflection coefficient Γ1 that is different than Γ2. As noted above, the second regions may be markers in any shape such as circular, rectangular or other shapes with an enclosed geometry. The second regions for a given ball may each be placed on the same layer or on different layers. Alternatively, the second regions may be comprised of typical ball materials, e.g. plastic or rubber for a golf ball while the first regions in this layer are formed of reflective materials.

According to another embodiment, a ball has the first regions and second regions as described above, with the additional limitation that the first and second regions are both formed of an electrically non-conductive material having the different microwave reflection properties as described above. According to still another embodiment, only the second regions are formed of an electrically non-conductive material, while the first regions are formed of an electrically conductive material. The first regions can be any mixture of materials. Typically for sports balls the material of the ball constructions is substantially the same for any spherical layer of the ball, however this is not a requirement. The important thing is that the microwave reflectivity of the second regions is noticeably different from that of the first regions, thereby amplifying the spin generated modulation of the received Doppler signal The second regions can be considered as forming the markers discussed above. The markers may be distributed at a variety of depths within the ball so long as the projections of the markers to the outer surface of the ball are distributed over the outer surface following the first positioning limitation and, optionally, the second positioning limitation as discussed above. The markers may have any closed shape and need not be identical. The total area of all the markers together typically covers from 1-50% of the surface area of the ball. When the marker is positioned on a layer of the ball that is below the outermost layer, the area is projected from the center of the ball to the outer surface, and this projected marker area is used for the determination of whether the first marker positioning requirement is met.

The microwave reflection coefficient $\Gamma$ at a transition from one medium to another depends on the relative differences between the media for one of the following parameters: the permittivity $\varepsilon$, the permeability and the conductivity $\sigma$. If one or more of these 3 parameters are different, the microwave will have some of its electromagnetic field reflected in the boundary region between the two mediums.

The microwave reflection coefficient $\Gamma$ between two mediums is given by: $\Gamma=Z1-Z2/Z1+Z2$ where Z1 is the wave impedance in medium 1 and Z2 is the wave impedance in medium 2. The reflection coefficient can be a complex number, i.e. a number having a magnitude $|\Gamma|$ and a phase phase($\Gamma$).

Different materials may be used for the second regions. However, electrically conductive materials such as aluminum, copper and silver generate good results. In particular inks containing silver have been shown to be particularly well suited for the second regions.

According to another embodiment, a spherical ball is marked to satisfy only one the positioning requirement discussed above. In this embodiment, the marker positioning requirement is that any great circle around the spherical ball may be, at maximum, a given distance d away from the closest one of the markers, where the distance d is at maximum 1% of the diameter of the ball Similar to above, the markings may be applied on any layer of a typical multi-layered ball. For a golf ball, the ball markings may also be applied on top of the cover, but for more durable markings, it is preferred to place the markings on one or more of the inner layers of the ball. It is noted that the deeper the marking is found in the ball, i.e. the lower the layer the marking is on, the more layers the radar has to "see through." The more ball material the microwave radiation needs to penetrate to reach the marker, the more attenuated the signal will become, rendering the marking less effective for providing useful data. Typically, a compromise may be made by disposing the markings under the outer coating but on top of the cover, the cover being on top of the mantle (or core) of the ball. Alternatively, the markings may be placed directly under the cover. Similar to above, the markings may be applied at different layers of the ball.

Many different patterns of ball markings may be made to satisfy the positioning requirement. However, production limitations may limit what patterns are feasible. For example, there might be areas of the ball that are excluded from being marked based on the production equipment. Similar to above, the marking pattern may include circular-shaped markings. However, any shape for the markings is feasible, including rectangular, pentagonal, hexagonal, star-shaped etc. In some production setups applying the second regions will happen by stamping the second regions with, f.ex., conductive ink. For this operation to be cost effective, it may be required to stamp the ball only once. Depending on the construction of the fabrication machinery this single stamping may limit the application of ink primarily to a single hemisphere of the ball leaving only this half of the ball or even a slightly smaller area available for the inclusion of the second regions. This type of production setup eliminates the extra curing time that might be necessary if more than one application of ink were to be employed (i.e., eliminating curing time between the first application and a second application, etc.) as well as the time required to reposition the ball and perform the second application of ink.

In one embodiment, the marking pattern may be coextensive with a seam running around the ball, such as a baseball seam or follow a path that is similar to such a path even if it is not in the same position as the seams. The marking pattern need not cover the entire seam, i.e., may be a dashed marking pattern, to satisfy the positioning requirement. As would be understood by those skilled in the art, the seam of a baseball generally forms a continuous curved path along which two cover pieces are joined to one another. Each of the two cover pieces is generally formed as a planar shape with two rounded ends coupled to one another by a central narrow portion. Thus, when these two cover pieces are stretched over a spherical core, they meet along a continuous curved path (see, 302 in FIG. 9) which crosses every great circle around the ball.

Other marking patterns may be similar to the seam patterns found on a tennis ball, soccer ball, basketball, volleyball, or any other sports ball especially where these seam-type patterns cross every great circle around a ball. Those skilled in the art will understand that, any of the seam-shaped marking schemes are not applicable only to baseballs or other seamed balls, but may be applied to any sports ball such as a golf ball whether it has seams or not. These seam-shaped marking patterns may also be dashed, while still satisfying the positioning requirement. In other embodiments, the markings may be coextensive with a text pattern on the ball that is used for e.g. visual branding of the ball. For some balls, these visual text patterns are typically applied on the cover of the ball underneath a coating. As noted above, the markings may be applied on any layer, including visible and non-visible layers. Making the markings dashed is one way to reduce the amount material needed for the marking, and may also decrease risk of deteriorating the adhesive properties for the second regions.

When the markings are disposed in the seam-like pattern, an additional requirement is imposed. Specifically, the seam-like markings are required to have a width between ½0 to ½ the wavelength of the radiation used by the radar. For example, for a golf ball having a diameter of 42.7 mm and a radar operating at 10-24 GHz (corresponding to a wavelength of 10-30 mm), a suitable width for the markings is approximately 1-10 mm. However, other radars may be used that operate in a different microwave frequency spectrum, e.g. anywhere from 1-125 GHz. Furthermore, it may be desirable to use larger markers on larger balls even if the wavelength of the radar signal is the same.

Some examples of the feasible seam patterns are shown in the FIGS. 2-3 below. One of the examples shows optional text patterns intended for visual branding of the ball. The text does not need to be a marked area having a different reflectivity, but may be. The visual text patterns are typically applied on the cover underneath a coating, whereas the seam pattern for ball marking can be applied on any layer on the ball being visible or not visible.

Figure 2A:
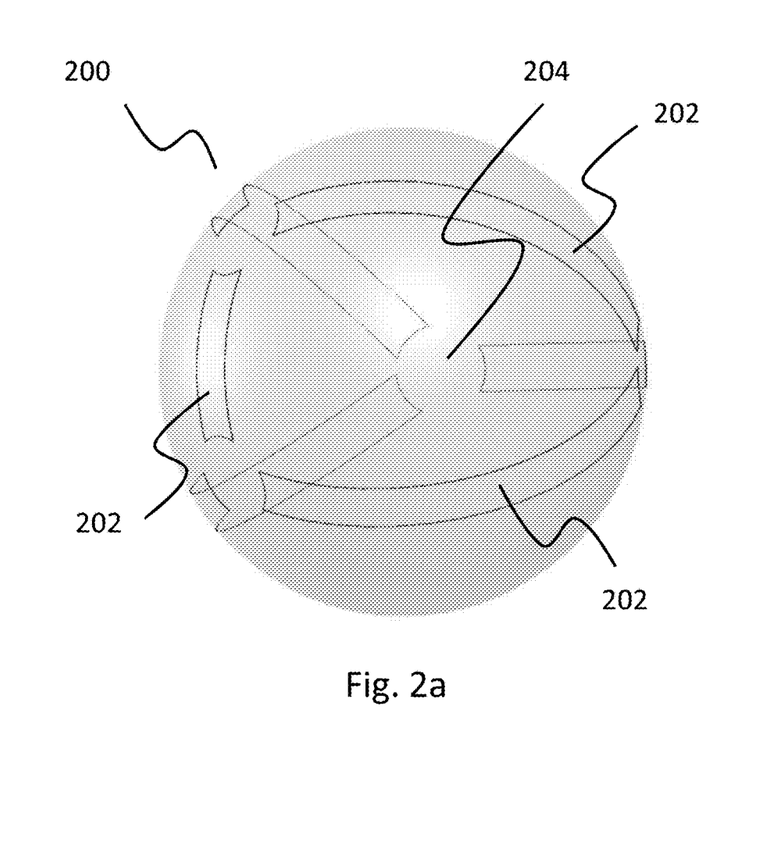
FIGS. 2a-b show a marked ball with a first marking pattern according to one embodiment of the present disclosure.
Figure 2B:
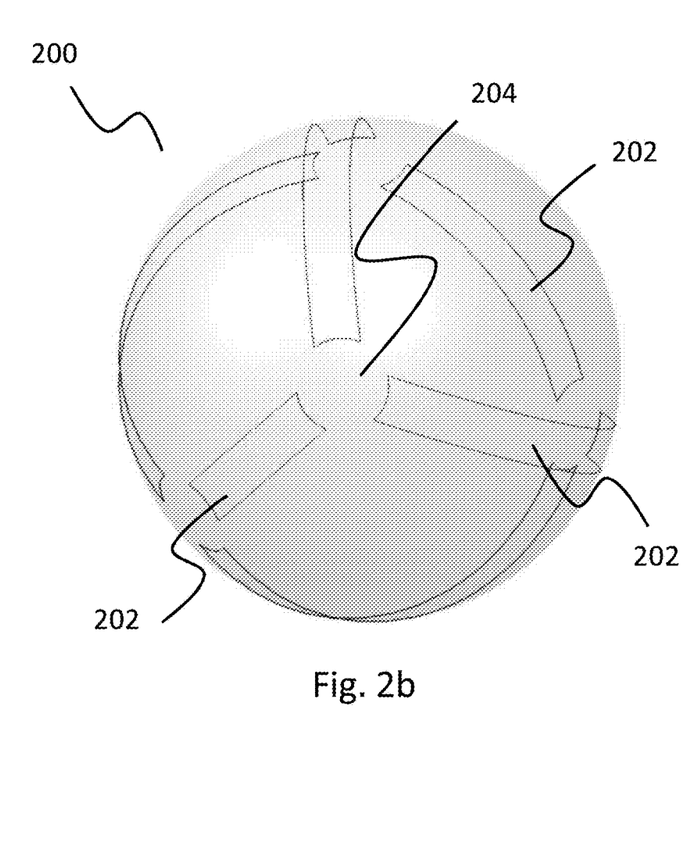

FIGS. 2a-b show a marked ball 200 with a first marking pattern according to one embodiment of the present disclosure. The ball 200 is marked with six stripes 202 arranged to connect four marking gaps 204 on the ball. The ball 200 is shown transparently to illustrate all the markings 202. As shown, the stripes 202 are not fully connected, but leave the marking gaps 204 surrounding the points at which the stripes 202 would intersect. In other embodiments, the stripes 204 may not be completely straight lines or of equal width. For example, the stripes 204 may be tapered, if desired. In general, the markings need to be distributed over the surface of the ball relative to every great circle so that both the first and second regions generate noticeable radar modulations due to the spin of the ball.

This can be achieved by making sure that the length of each marker of the second regions touching a great circle is sufficient compared to the wavelength and the length of the area of the first regions between the markings is also sufficient compared to the wavelength to generate the spin modulations regardless of the orientation of the ball and the spin axis relative to the radar. Sufficient length compared to the wavelength means it is longer than typically 1/20 of a wavelength, but will more preferably be closer to 0.2 times the wavelength for the second regions. In order to save cost in the application of the second regions, it is desirable to have the second regions being at maximum 25% of the accumulated distance along any great circle. This means that f.ex. a second region formed as an entire equator around the ball is not desirable, since the great circle that coincides with this equator will have 100% second regions along the great circle, and as such only very weak spin modulation will be generated with this particular spin axis.

Figure 3A:
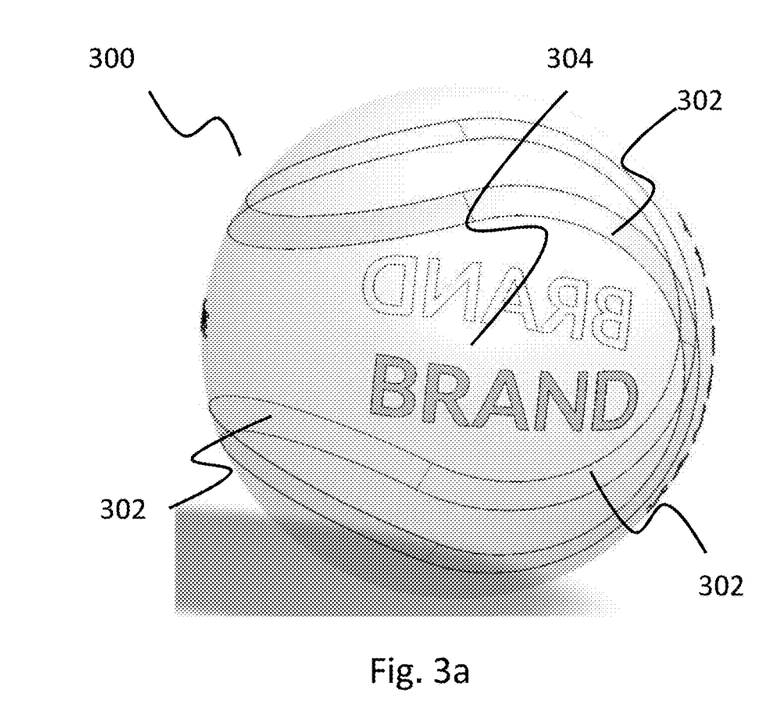
FIGS. 3a-b show a marked ball with a second marking pattern according to one embodiment of the present disclosure.
Figure 3B:
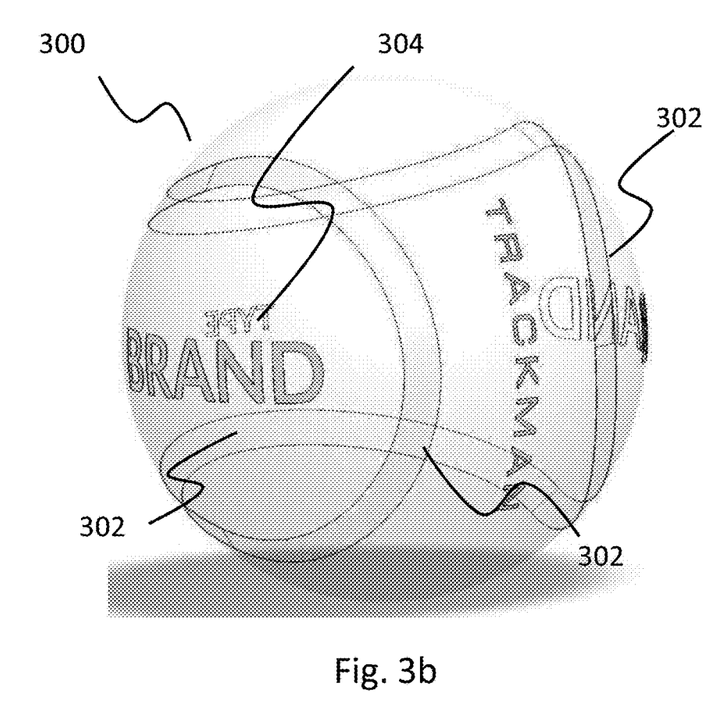

FIGS. 3a-b show a marked ball 300 with a second marking pattern according to one embodiment of the present disclosure. The ball 300 is marked with a baseball seam-style pattern 302 of material having different reflective properties than the remainder of the ball 300. The seam need not be continuous, but can be dashed. The ball 300 also includes a brand area 304 for a company to mark the ball with a brand. As discussed above, a brand area may also be used for the reflective markings, if desired.

Figure 4:
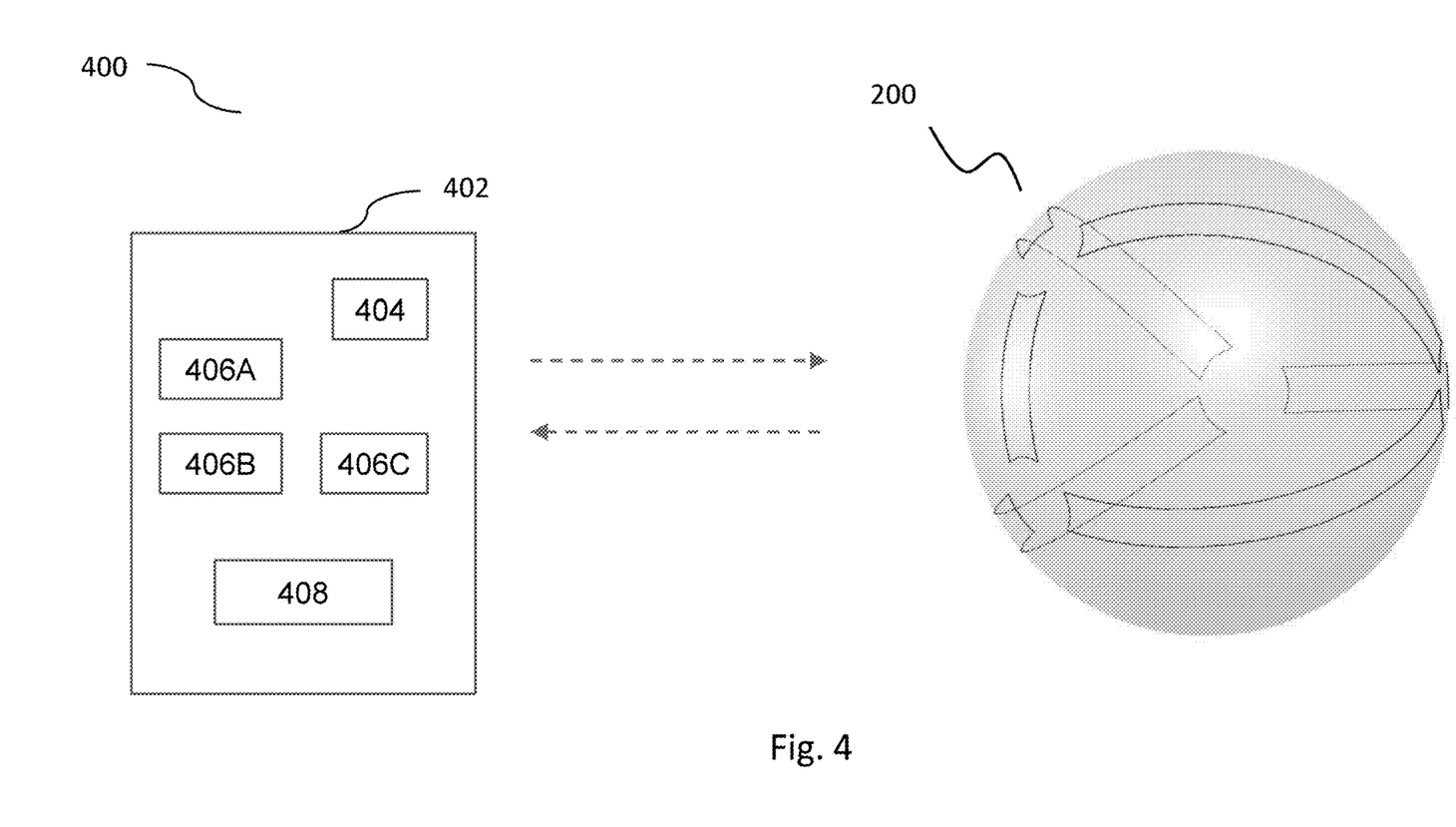
FIG. 4 shows a system for determining a spin axis of a sports ball according to an exemplary embodiment of the present invention.

FIG. 4 shows a system 400 for determining a spin axis of a sports ball according to the exemplary embodiments. The system 400 includes a radar device 402 aimed at a target area through which a sports ball is to pass during at least a part of its flight. In the exemplary system 400, the sports ball is the sports ball 200 discussed above. However, the sports ball 200 may represent any sports ball marked according to the marker positioning requirements discussed above. The radar 402, in this embodiment, comprises a transmitter 404 and at least three receivers 406. The receivers 406, in this embodiment, are distributed such that receivers 406A and 406B are vertically aligned with one another and receivers 406A and 406C are aligned horizontally with one another.

However, it will be understood by those skilled in the art that the receivers 406 do not need to be vertically or horizontally aligned so long as the radar device 102 includes three or more receiver antennas where a minimum of three of the receiver antennas are not co-linear with one another. It will be understood by those skilled in the art that the receiver pairs need not be orthogonal to one another. As would be understood by those skilled in the art, the geometrical arrangement of the separated receivers 406A, 406B, 406C permits analysis of radar signals reflected from sports ball to the receivers 406A, 406B, 406C to derive an orientation of the spin axis of the ball (an axis about which the ball is spinning) at one or more points in time.

The radar 402 may be, for example, a continuous wave Doppler radar emitting microwaves at an X-band frequency (10 GHz) at a power of up to 500 milliWatts EIRP (Equivalent Isotropic Radiated Power), thus being compliant with FCC and CE regulations for short range international radiators. However, in other jurisdictions, other power levels and frequencies may be used in compliance with local regulations. In an exemplary embodiment, microwaves are emitted at a higher frequency between, for example, 5-125 GHz. For more precise measurements at lower object speeds, frequencies of 20 GHz or higher may be used. Any type of continuous wave (CW) Doppler radar may be used, including phase or frequency modulated CW radar, multi frequency CW radar or a single frequency CW radar.

It will be understood that other tracking devices such as lidar may be used with radiation in either the visible or non-visible frequency region. Current-pulsed radar systems are limited in their ability to track objects close to the radar device. However, the distance an object must be from these pulsed radar systems has decreased over time and is expected to continue to decrease. Thus, these types of radar may soon be effective for these operations and their use in the systems of the invention described below is contemplated. Throughout the application, the tracking of objects is described based on the use of Doppler frequency spectrums. As would be understood, these Doppler frequency spectrums refer to the Doppler spectrum from any type of radar or lidar used.

The system 400 further includes a processing unit 408 which, as would be understood by those skilled in the art, may include one or more processors in communication with the radar device 402 (or multiple radar devices) via, for example, a wired or wireless connection. In an embodiment the processing unit 408 includes a computer associated with the radar device 402.

In the embodiment of FIG. 4, the system 400 is a system for determining the spin axis of a ball, e.g. the ball 200, launched within or into a target area from a given launch position, the target area being within a field of view of the radar 402. As would be understood by those skilled in the art, the target area does not need to be any specially created area and the launch position may be any location within or outside the field of view of the radar 402. When launched into the target area, the ball 200 travels along a flight path while spinning in a spin direction around a spin axis. Those skilled in the art will understand that, although the spin of a golf ball 200 is produced by the striking of the golf ball 200 with a golf club, the same analysis may be applied to any sports ball whether it has been batted, thrown, kicked, headed, hit by any striking implement (e.g., a baseball bat) etc.

The radar 402 tracks the golf ball 200 as it is launched from the launch location (if the launch location is within the field of view of the radar 402) or when the golf ball 200 enters the field of view of the radar 402 and travels along the flight path. As the golf ball 200 moves, radar signals produced by the radar 402 are reflected by the golf ball 200 and subsequently received by the radar receivers 406. The spin parameters may then be determined based on the Doppler shift of the received signals relative to the transmitted signals. Exemplary calculations for determining the spin parameters is described in U.S. Patent Publication No. 2019/0282881, the disclosure of which is hereby incorporate by reference.

Figure 5:
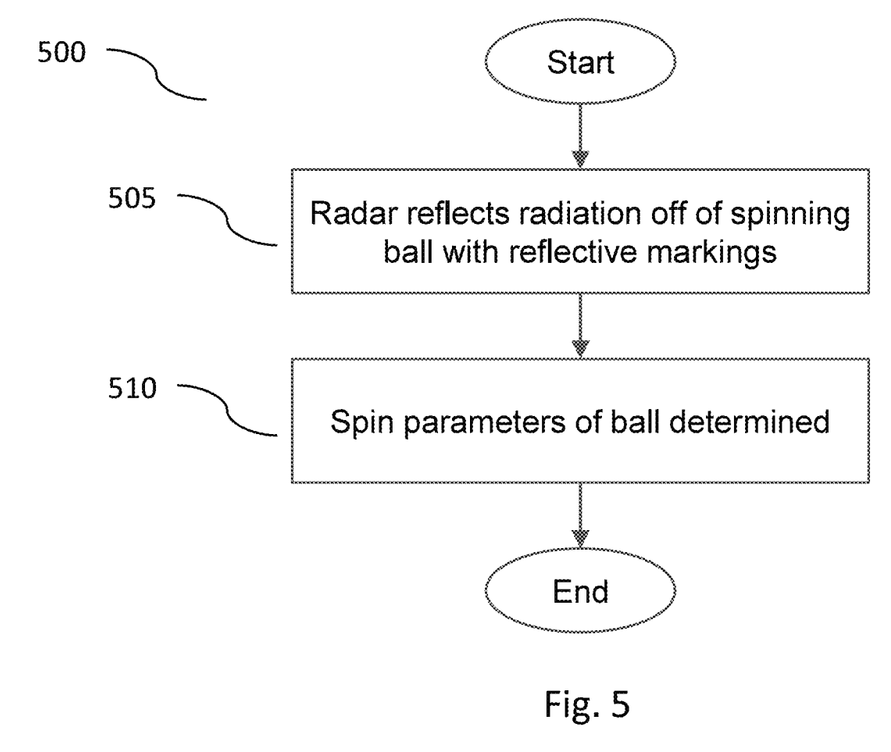
FIG. 5 shows an exemplary method for determining the spin axis of a spinning golf ball according to an exemplary embodiment of the present invention.

FIG. 5 shows an exemplary method 500 for determining the spin axis of a spinning ball. In this embodiment, a multi-receiver radar setup is utilized including three receiver antennas 406A, 406B, 406C mounted in a plane. Optionally, additional receiver antennas may be used to increase the accuracy of the determined positions and to derive a three-dimensional (3D) spin axis. The spinning ball is marked with a reflective material in accordance with the marker positioning requirements discussed above.

In 505, the radar 402 produces signals which are transmitted into a target area and received after reflection from a spinning golf ball by the receivers 406A, 406B, 406C, generating a corresponding signal exhibiting a Doppler frequency spectrum. It will be understood that the ball may be stationary or moving in any direction relative to the radar 402. Due to the spinning motion of the ball, the received Doppler signal is broadened around a value of the Doppler shift associated with the translational motion of the ball relative to the radar 402. That is, the reflected signals will be spread across a range of frequencies reflecting the range of relative velocities of different parts of the ball as it is spinning and moving relative to the radar 402. The reflected signals from the marked regions of the ball, i.e., the regions of the ball having a different reflectivity than the remainder of the ball, will be amplified due to the increased contrast between the areas of enhanced reflectivity and the remainder of the ball 200.

In 510, three-dimensional spin parameters are determined from the reflected signals. The spin parameters include at least a spin rate and an orientation of the spin axis of the spinning ball.

It will be appreciated by those skilled in the art that changes may be made to the embodiments described above without departing from the inventive concept thereof. It should further be appreciated that structural features and methods associated with one of the embodiments can be incorporated into other embodiments. It is understood, therefore, that this invention is not limited to the particular embodiment disclosed, but rather modifications are also covered within the scope of the present invention as defined by the appended claims.

The invention claimed is:

1. A sports ball configured to enhance detection of spin properties by a radar, comprising:
   a spherical body comprising an exterior surface having a first reflectivity with respect to a radiation generated by the radar to be used in detecting spin of the sports ball and being semi-transparent with respect to the radiation generated by the radar; and
   a first marker having a second reflectivity with respect to the radiation generated by the radar to be used in detecting spin of the sports ball, the second reflectivity being different from the first reflectivity, the first marker being embedded within the sports ball on an interior surface of the sports ball, wherein the radiation generated by the radar can penetrate the semi-transparent exterior surface of the sports ball to reach the first marker, the first marker extending along a path crossing every great circle extending around the sports ball, wherein the first marker is formed as at least three strips, a first strip extending along a first great circle of the interior surface, a second strip extending along a second great circle of the interior surface, and a third strip extending along a third great circle of the interior surface, wherein the first, second and third great circles are not coextensive and meet at a location on the interior surface, wherein, on a first hemisphere of the interior surface having the location at its center, the first strip extends in a first direction away from the location toward a second hemisphere, the second strip extends in a second direction away from the location toward the second hemisphere, and the third strip extends in a third direction away from the location toward the second hemisphere,
   wherein a width of each of the first, second and third strips is selected to be between ½₀ to ½ of a wavelength of the radiation used by the radar to be used in tracking the sports ball.

2. The sports ball of claim 1, wherein the first marker is formed as a series of discrete marks of the second reflectivity the discrete marks being separated from one another along the path by no more than a distance d so that every great circle extending around the sports ball is separated from at least one of the discrete marks by a distance no greater than the distance d.

3. The sports ball of claim 2, wherein at least one of the discrete marks is a portion of a spherical surface within the sports ball circumscribed by a circle, the spherical surface having the same center as the sports ball.

4. The sports ball of claim 2, wherein the discrete marks are rectangular and a projection on the exterior surface of the sports ball of each of the discrete marks comprises a pyramid extending from a center of the sports ball to the exterior surface of the sports ball circumscribing the corresponding discrete mark.

5. The sports ball of claim 4, wherein at least one of the discrete marks is a planar rectangle embedded within the sports ball.

6. The sports ball of claim 4, wherein at least one of the discrete marks is a portion of a spherical surface within the sports ball circumscribed by the pyramid extending from the center of the sports ball to the exterior surface of the sports ball.

7. The sports ball of claim 1, wherein the width of each of the first, second and third strips is between 1 and 10 mm.

8. The sports ball of claim 1, wherein the second reflectivity is greater than the first reflectivity with respect to the radar.

9. The sports ball of claim 1, wherein a first angle between the first strip and the second strip is equal to a second angle between the first strip and the third strip.

10. The sports ball of claim 9, wherein the first angle and the second angle are greater than 90 degrees such that the first, second and third strips form a Y shape in the first hemisphere of the interior surface.

11. A sports ball configured to enhance detection of spin properties by a radar, comprising:
    a spherical body comprising an exterior surface having a first reflectivity with respect to a radiation generated by the radar to be used in detecting spin of the sports ball and being semi-transparent with respect to the radiation generated by the radar; and
    a first marker having a second reflectivity with respect to the radiation generated by the radar to be used in detecting spin of the sports ball, the second reflectivity being different from the first reflectivity, the first marker being embedded within the sports ball on an interior surface of the sports ball, wherein the radiation generated by the radar can penetrate the semi-transparent exterior surface of the sports ball to reach the first marker, the first marker extending along a path crossing every great circle extending around the sports ball, wherein the path is a curved path including a first rounded portion in a first hemisphere of the interior surface and a second rounded portion in a second hemisphere of the interior surface, the first and second rounded portions connected to one another by a narrow central portion,
    wherein a width of the first marker is selected to be between ½₀ to ½ of a wavelength of the radiation used by the radar for to be used in tracking the sports ball.

12. The sports ball of claim 11, wherein the path corresponds to a shape of a seam pattern of a baseball.

13. The sports ball of claim 11, wherein the sports ball is a baseball and a projection of the path on the exterior surface of the baseball is coextensive with a seam pattern on the exterior surface of the baseball.

14. The sports ball of claim 11, wherein the width of the first marker is between 1 and 10 mm.

\* \* \* \* \*